(12) United States Patent
Lee

(10) Patent No.: US 7,057,557 B2
(45) Date of Patent: Jun. 6, 2006

(54) APPARATUS AND METHOD FOR ESTIMATING POSITION OF MOBILE COMMUNICATION TERMINAL

(75) Inventor: Yong Woo Lee, Kyongsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 10/125,531

(22) Filed: Apr. 19, 2002

(65) Prior Publication Data

US 2002/0167444 A1 Nov. 14, 2002

(30) Foreign Application Priority Data

Apr. 20, 2001 (KR) ............................... 2001-21456
Jun. 2, 2001 (KR) ............................... 2001-30996

(51) Int. Cl.
*G01S 3/02* (2006.01)

(52) U.S. Cl. .................................................... 342/465

(58) Field of Classification Search ........ 342/457–458, 342/463, 465, 387
See application file for complete search history.

(56) References Cited

U.S. PATENT DOCUMENTS

| | | | | |
|---|---|---|---|---|
| 5,166,694 A | * | 11/1992 | Russell et al. | 342/457 |
| 5,208,756 A | * | 5/1993 | Song | 342/457 |
| 5,515,062 A | * | 5/1996 | Maine et al. | 342/457 |
| 5,945,948 A | * | 8/1999 | Buford et al. | 342/457 |
| 6,208,297 B1 | | 3/2001 | Fattouche et al. | 342/450 |
| 6,246,884 B1 | * | 6/2001 | Karmi et al. | 342/457 |

FOREIGN PATENT DOCUMENTS

| | | |
|---|---|---|
| CN | 1231730 A | 10/1999 |
| EP | 0 933 961 A2 | 8/1999 |
| EP | 0 933 961 A3 | 2/2000 |
| EP | 1 030 531 A1 | 8/2000 |
| WO | WO 98/10306 | 3/1998 |
| WO | WO 98/10306 | 12/1998 |
| WO | WO 00/11804 | 3/2000 |

OTHER PUBLICATIONS

M. Aatique, Evaluation of TDOA Technique for Position Location in CDMA System, Master's Thesis at Virginia Polytechnic Institute and State University, p. 11-12, 107-110, Sep. 1997.*
R.I. Reza, Data Fusion For Improved TOA/TDOA Position Determination in Wireless Systems, Master's Thesis at Virginia Polytechnic Institute and State University, p. 5-6, 90, Jul. 2000.*
P. Deng et al., An AOA assisted TOA positioning system, International Conference on Communication Technology Proceeding vol. 2, p. 1501-1504, Aug. 2000.*
Drane, Christopher, MacNaughtan, Malcolm and Scott, Craig "Positioning GSM Telephones", vol. 36, No. 24, Apr. 1, 1998, pp. 46-54, 58; IEEE Communications Magazine, IEEE Service Center, Piscataway, NJ (XP000752570).

* cited by examiner

*Primary Examiner*—Thomas H. Tarcza
*Assistant Examiner*—F H Mull
(74) *Attorney, Agent, or Firm*—Fleshner & Kim, LLP

(57) ABSTRACT

A position estimating method and apparatus are disclosed that determine an angle of arrival of a signal received from a terminal; determine a distance of the terminal, using an arrival time difference between the arrival time of the signal and a reference time; and determine a position of the terminal based on the determined angle of arrival and distance.

4 Claims, 6 Drawing Sheets

APPARATUS AND METHOD FOR ESTIMATING POSITION OF MOBILE COMMUNICATION TERMINAL

BACKGROUND OF THE INVENTION

1. Field of the Invention

The present invention relates to an apparatus and method for estimating a position of a mobile communication terminal and, more particularly, to improving a plotting function by combining position estimating methods.

2. Background of the Related Art

There are various methods for estimating a position of a terminal in a mobile communication system. Among the methods applied to a Code Division Multiple Access (CDMA) cellular system are a method that modifies a terminal and a method that does not modify a terminal.

Representative of the method that modifies the terminal is a plotting method, based on a terminal. This method requires a Global Positioning System (GPS) receiver to be installed in a mobile communication terminal carried by a user.

FIG. 1 is a view showing a plotting method for a mobile communication terminal using a GPS satellite. When the GPS receiver 101 installed in the mobile communication terminal is operated, by pushing a predetermined button on the mobile communication terminal, it receives a signal from the GPS satellites 102. Based on these signals, GPS receiver 101 calculates the distances (r11, r12, r13, and r14) between the mobile communication terminal and the respective satellites. To estimate a three dimensional position, GPS receiver 101 should receive signals from more than four GPS satellites, and to estimate a position in two dimensions, GPS receiver 101 should receive signals from more than three GPS satellites. A mobile communication exchanger 103 calculates the position of the mobile communication terminal using additional information received from the GPS satellite 102, and after that, the calculated position is automatically transmitted to an application server 104 using the CDMA cellular network.

On the other hand, there is a terminal position estimating method based on a network that does not need to modify the terminal. The above method can be divided into a Time of Arrival (TOA) method, using the arrival time of a signal transmitted to a respective base station; a Time Difference of Arrival (TDOA) method, using arrival time differences of mobile communication terminal signals transmitted to respective base stations; an Angle of Arrival (AOA) method using arrival angles of signals transmitted to the respective base stations; and a Radio Frequency Finger Printing (RFFP) method, using intensity data of a base station signal, which is measured within divisions of the service area in advance.

FIG. 2 is a view showing the TOA method that uses the arrival time of the signal. A plurality of base stations 202, around a mobile communication terminal 201, receive a signal transmitted from the mobile communication terminal 201. Then, the respective base stations 202 measure the arrival time of the transmitted signal to calculate distances (r21, r22, and r23) between mobile communication terminal 201 and base stations 202. Virtual circles, centered around the respective base stations 202, are drawn having respective radii of r21, r22, and r23 such that the position where the circles cross each other is the estimated position of mobile communication terminal 201.

FIG. 3 is a view showing the AOA method, using an arrival angle of the signal. A plurality of base stations 302, around a mobile communication terminal 301, receive a signal transmitted from mobile communication terminal 301. The respective base stations 302 measure the arrival angle ($\Theta_1$, $\Theta_2$) of the transmitted signal. A virtual line is drawn from each base station 302 along the respective arrival angle of the received signal. The position where the lines cross each other is estimated to be the position of mobile communication terminal 301.

FIG. 4 is a view showing the TDOA method, using the arrival time difference of a signal. A plurality of base stations 402, around a mobile communication terminal 401, receive a signal transmitted from the mobile communication terminal 401. Distances r41, r42, and r43 are calculated using the arrival time differences of the signal transmitted to base stations 402, and hyperbolic curves are drawn using the distances. The position where the hyperbolic curves cross each other is estimated to be the position of mobile communication terminal 401.

However, the position estimating method using the GPS requires a GPS receiver to be installed in the terminal, thereby increasing the production cost, size, and weight of the mobile communication terminal. In addition, the GPS receiver also uses the terminal's battery power, thereby increasing the power consumption of the terminal.

Also, with the position estimating method, the signal transmitted from the GPS satellite is very weak upon arrival at the terminal. Therefore, it is difficult to receive the GPS signal if there are obstacles between the terminal and the GPS satellite, such as in an urban area or indoor, whereby the functionality is lowered.

On the other hand, the network based position estimating method that does not modify the terminal does not require installation of the GPS receiver in the mobile communication terminal. The CDMA cellular network can be used as it is.

However, the TOA method, using the arrival time, and the TDOA method, using the arrival time difference, should use at least three base stations around the mobile communication terminal. The AOA method, using the arrival angle, should use at least two base stations. However, if the user is in a rural or suburban area, there is little chance that there are two or three base stations around the user.

Usually, there is only one base station in the cell where the user is located, and the other base stations are located far from the user. Therefore, the signal from the mobile communication terminal is difficult to receive by the other base stations and may be received with many errors. Therefore, it is difficult to estimate the position of the mobile communication terminal.

As described above, it is difficult to estimate the position of the mobile communication terminal using only one estimating method, such as the arrival time method, arrival angle method, or arrival time difference of signal method, in the rural or suburban area.

SUMMARY OF THE INVENTION

An object of the invention is to solve at least the above problems and/or disadvantages and to provide at least the advantages described hereinafter.

Therefore, an object of the present invention is to provide an apparatus and a method for estimating the position of a mobile communication terminal.

Another object of the present invention is to improve a position estimating function by combining network-based position estimating methods.

A further object of the present invention is to apply the position estimating function to a Code Division Multiple Access (CDMA) cellular network.

To achieve one or more objects, there is provided a position estimating apparatus for a mobile communication terminal, including a mobile communication exchanger for receiving a signal that is transmitted/received between a mobile communication terminal and respective base stations; a position calculation unit for calculating a distance between the mobile communication terminal and a base station or an arrival angle, by a signal received through the mobile communication exchanger; and a position deciding unit for deciding a position, which is calculated after combining values calculated in the position calculation unit as a position of the terminal.

In addition, there is provided a position estimating apparatus, including a mobile communication exchanger for receiving position information of a mobile communication terminal through a base station; a time of arrival (TOA) calculation unit for calculating a distance between the mobile communication terminal and the base station through the arrival time of the signal; an angle of arrival (AOA) calculation unit for calculating a distance between the mobile communication terminal and the base station using an arrival angle of the signal; and a position deciding unit which estimates a position of the mobile communication terminal by averaging the calculated values of the TOA calculation unit and the AOA calculation unit.

Also, there is provided a position estimating apparatus, including a mobile communication exchanger for receiving position information of a mobile communication terminal through a base station; a time difference of arrival (TDOA) calculation unit for calculating a distance between the mobile communication terminal and the base station through an arrival time difference of the signal; an angle of arrival (AOA) calculation unit for calculating a distance between the mobile communication terminal and the base station; and a position deciding unit for estimating the position of the terminal by comparing calculated values of the TDOA calculation unit and the AOA calculation unit.

To achieve one or more objects of the present invention, there is provided a position estimating method for a mobile communication terminal, including estimating a position of a mobile communication terminal using an arrival angle of a signal between a mobile communication terminal and respective base stations with a predetermined time interval; estimating a position of the terminal using an arrival time or an arrival time difference of the signal between the mobile communication terminal and the respective base stations with a predetermined time interval; and deciding a final position of the mobile communication terminal by combining the position of the terminal using the arrival angle and the position of the terminal using the arrival time or the arrival time difference.

In addition, there is also provided a position estimating method for a mobile communication terminal, including estimating a position of a mobile communication terminal using an arrival angle of a signal between a mobile communication terminal and a base station; estimating a position of the terminal using an arrival time of the signal between the mobile communication terminal and the base station; drawing a virtual circle making a distance calculated using the arrival time of the signal as a radius and an extended line toward the arrival angle and setting positions where the circle and the line are crossed with each other as estimated positions; and deciding an average coordinate of the above plurality of estimated positions.

In addition, there is also provided a position estimating method for a mobile communication terminal, including measuring a position of a mobile communication terminal using an arrival angle of a signal between the terminal and a base station; measuring a position of the terminal using an arrival time difference of the signal between the terminal and the base station; connecting the present positions of the mobile communication terminals, measured using the arrival angle and the arrival time difference of the signal, to the positions measured a predetermined time earlier, using virtual lines, respectively; drawing vertical lines toward the corresponding virtual line from the positions of the respective mobile communication terminals; calculating respective sum totals by adding lengths of the vertical lines; and deciding the position of the mobile communication terminal, which is measured using the method having shorter total length, as the final position of the terminal after comparing the total values of the respective methods.

The objects of the present invention may be further achieved in whole or in part by a position estimating method, including (a) determining an angle of arrival of a signal received from a terminal, (b) determining a distance of the terminal, using an arrival time difference between the arrival time of the signal and a reference time, and (c) determining a position of the terminal based on the determined angle of arrival and distance.

The objects of the present invention may be further achieved in whole or in part by a position estimating method, including (a) determining, for each of a plurality of base stations, an angle of arrival of a signal received from a terminal; (b) determining, for each of the plurality of base stations, a distance of the terminal, using an arrival time difference between the arrival time of the signal and a reference time; (c) determining a first position of the terminal based on the plurality of determined angles of arrival; and (d) determining a second position of the terminal based on the plurality of determined distances.

The objects of the present invention may be further achieved in whole or in part by a position estimating method, including (a) determining an angle of arrival of a signal received from a terminal, (b) determining a distance of the terminal, using an arrival time of the signal, and (c) determining a position of the terminal based on the determined angle of arrival and distance.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

When a mobile communication service provider is about to provide a transport company with a car navigation service, the mobile communication service provider transmits a position request message to a mobile communication terminal in the car, at a predetermined time interval. The mobile communication terminal receiving the position request message originates a certain signal that is received by a base station near the terminal. The base station near the terminal calculates the position of the terminal by a position estimating method, using an arrival time difference, an arrival angle, or an arrival time of the signal received by the base station.

Figure 1:
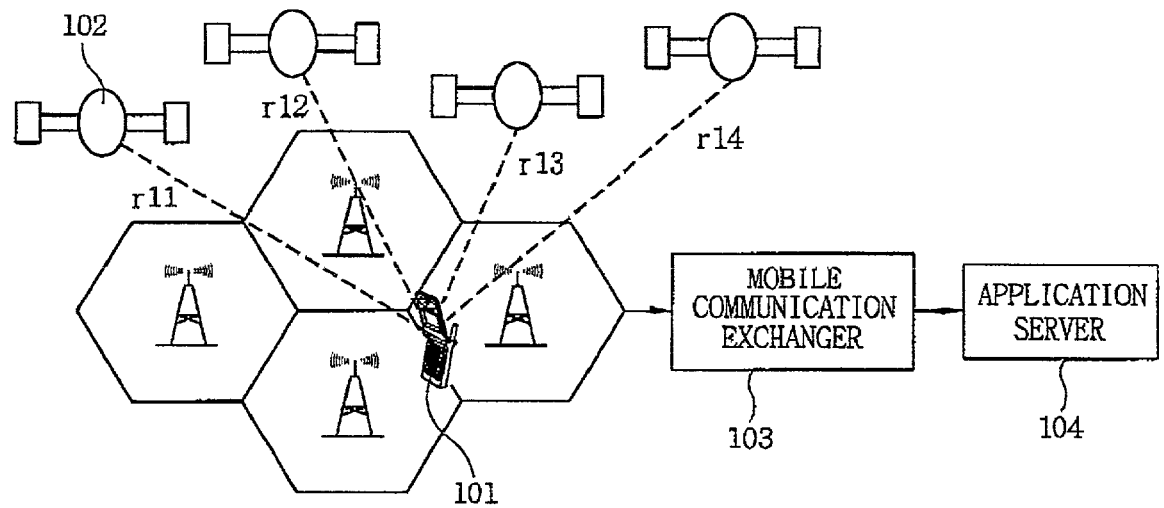
FIG. 1 illustrates a position estimating system for a mobile communication terminal using a GPS satellite, according to the background art.
Figure 2:
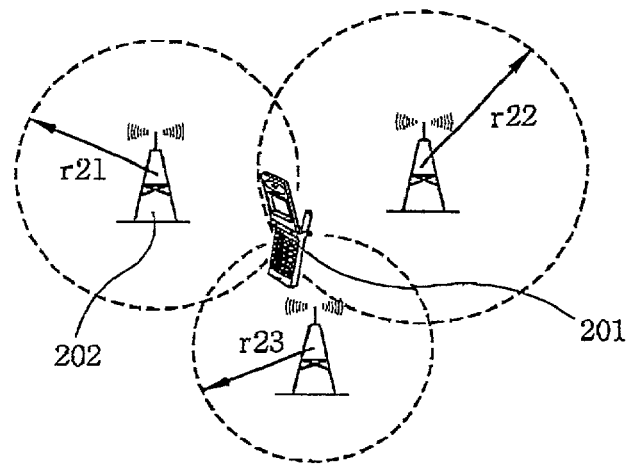
FIG. 2 illustrates a position estimating method for the mobile communication terminal using an arrival time, according to the background art.
Figure 3:
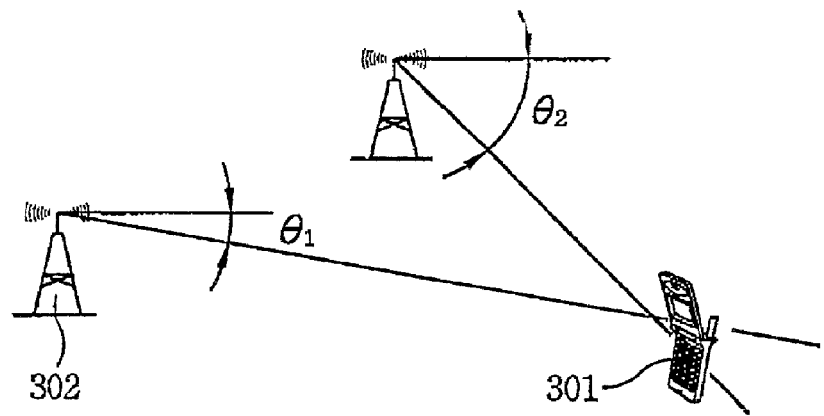
FIG. 3 illustrates a position estimating method for the mobile communication terminal using an arrival angle, according to the background art.
Figure 4:
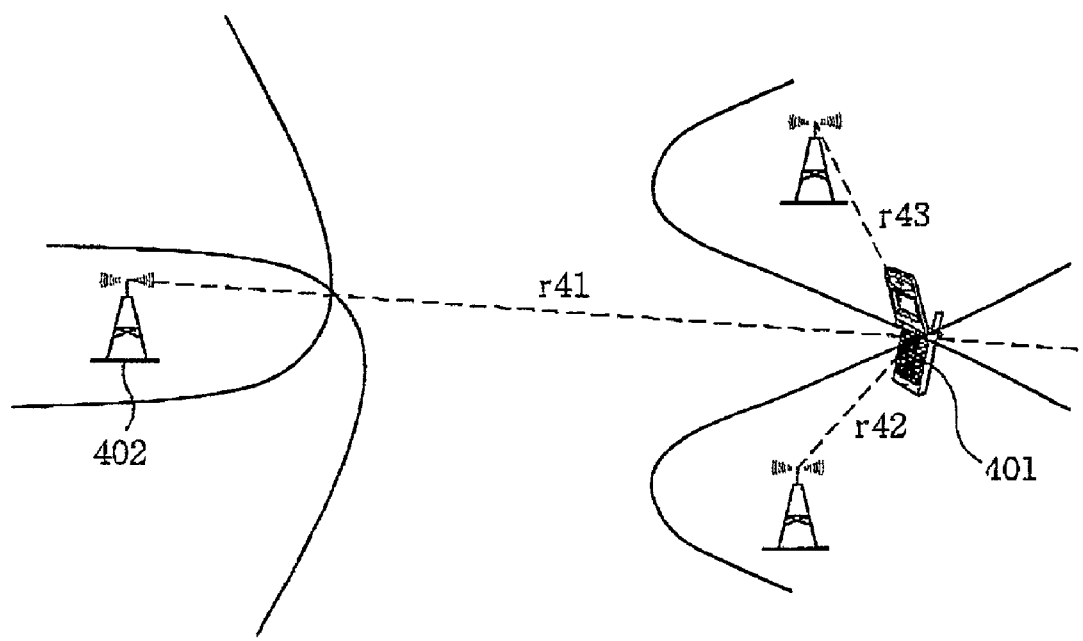
FIG. 4 illustrates a position estimating method for the mobile communication terminal using an arrival time difference, according to the background art.

The position estimating method, using the arrival time difference, will be described in detail with reference to FIG. 4. An arrival time difference between a signal transmitted to a base station 402, presently serving a mobile communication terminal 401, and a signal transmitted to another base station 402 is calculated. Equations of a hyperbola are made using the above calculation result.

$$r_i^2 = (x_i - x)^2 + (y_i - y)^2 \quad \text{(equation 1)}$$

$$r_{i,1} = cd_{i,1} = r_i - r_1 \quad \text{(equation 2)}$$

Equations 1 and 2 represent these hyperbola equations. Variables x and y represent positional coordinates of mobile communication terminal 401, which are to be determined. Variables $x_i$ and $y_i$ represent coordinates of i-th base station 402 and $d_i$ represents a difference between an arrival time of the signal transmitted to the first base station 402 and the arrival time of the signal transmitted to the i-th base station 402.

That is, in the case that the position of mobile communication terminal 401 is calculated using three base stations, the coordinates of x and y can be calculated using equation 3. In equation 3, $K_i$ represents $x_i^2 + y_i^2$, and $x_{i,1}$ represents $x_i - x_1$.

$$\begin{bmatrix} x \\ y \end{bmatrix} = -\begin{bmatrix} x_{2,1} & y_{2,1} \\ x_{3,1} & y_{3,1} \end{bmatrix}^{-1} \times \left\{ \begin{bmatrix} r_{2,1} \\ r_{3,1} \end{bmatrix} r_1 + \frac{1}{2} \begin{bmatrix} r_{2,1}^2 - K_2 + K_1 \\ r_{3,1}^2 - K_3 + K_1 \end{bmatrix} \right\} \quad \text{(equation 3)}$$

To calculate the position of the terminal using the arrival angle, an array antenna system is installed on the respective base station to find the angle of arrival of the signal transmitted to the base station. Then, a virtual line toward the arrival angle of the signal is drawn, and a position where the lines drawn from multiple base stations cross each other is estimated to be the position of the terminal.

Figure 5:
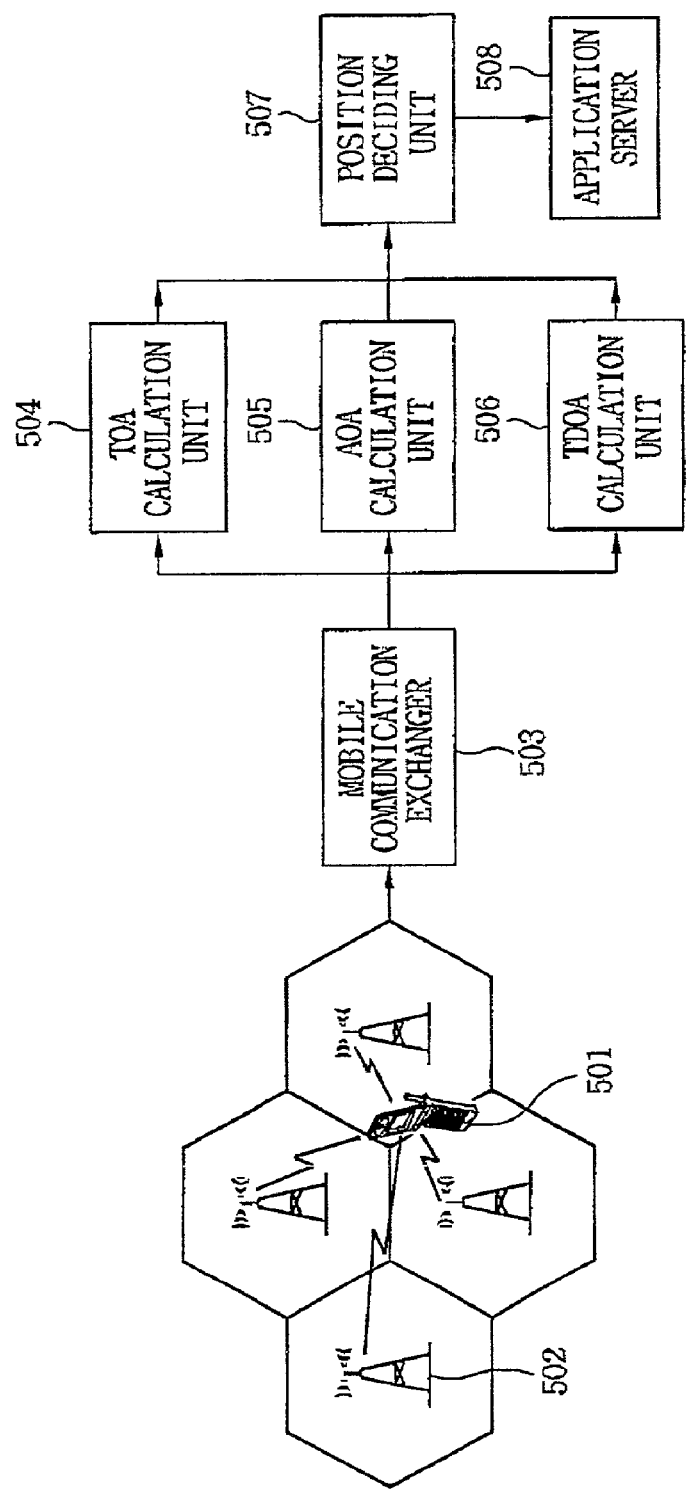
FIG. 5 illustrates a position estimating apparatus for the mobile communication terminal, according to the present invention.

FIG. 5 is a view showing a position estimating system according to the present invention. The position estimating system includes a mobile communication exchanger 503 for receiving a signal transmitted/received between a mobile communication terminal 501 and a respective base station 502; a time of arrival (TOA) calculation unit 504 for calculating a distance between the mobile communication terminal 501 and the base station using an arrival time of the signal, which is received through mobile communication exchanger 503; an angle of arrival (AOA) calculation unit 505 for calculating an arrival direction of terminal 501, from the signal received by mobile communication exchanger 503; a time difference of arrival (TDOA) calculation unit 506 for calculating a distance between terminal 501 and base station 502 using the arrival time difference of the signal received through mobile communication exchanger 503; a position deciding unit 507 for deciding the position calculated in TOA calculation unit 504 and AOA calculation unit 505, or the position calculated in arrival time difference unit 506 and AOA calculation unit 505, as the position of mobile communication terminal 501; and an application server 508 that requires the position information of mobile communication terminal 501.

Mobile communication exchanger 503 selectively transmits the signal received by base station 502 to the respective calculation unit, among TOA calculation unit 504, AOA calculation unit 505, and arrival time difference unit 506. Position deciding unit 507 figuratively draws an extended virtual line (i.e., ray) from base station 502 towards the direction calculated in AOA calculation unit 505. The virtual line intersects a virtual circle that is centered about base station 502 and has a radius equal to the distance calculated in TOA calculation unit 504. Position deciding unit 506 identifies the position where the circle and the extended line cross each other as the position of terminal 501, or estimates the position of the terminal using the TDOA calculation unit 506 and AOA calculation unit 505.

The position estimating system for the mobile communication terminal is operated as follows. The position signal of terminal 501, transmitted to the base station 502 of the cell where terminal 501 is located and to the other base stations 502 around terminal 501, is transmitted to mobile communication exchanger 503 from the respective base stations. Mobile communication exchanger 503 estimates the position of terminal 501 via TOA calculation unit 504, AOA calculation unit 505, and arrival time difference unit 506 using the transmitted signal.

Position deciding unit 507 estimates a plurality of virtual positions for the mobile communication terminal 501, before deciding on the final position of terminal 501. The final position is automatically transmitted to application server 508, which requires the position information of terminal 501, using the CDMA cellular network.

A first embodiment of the position estimating method, using the above position estimating system, according to the present invention will be described as follows.

Figure 6:
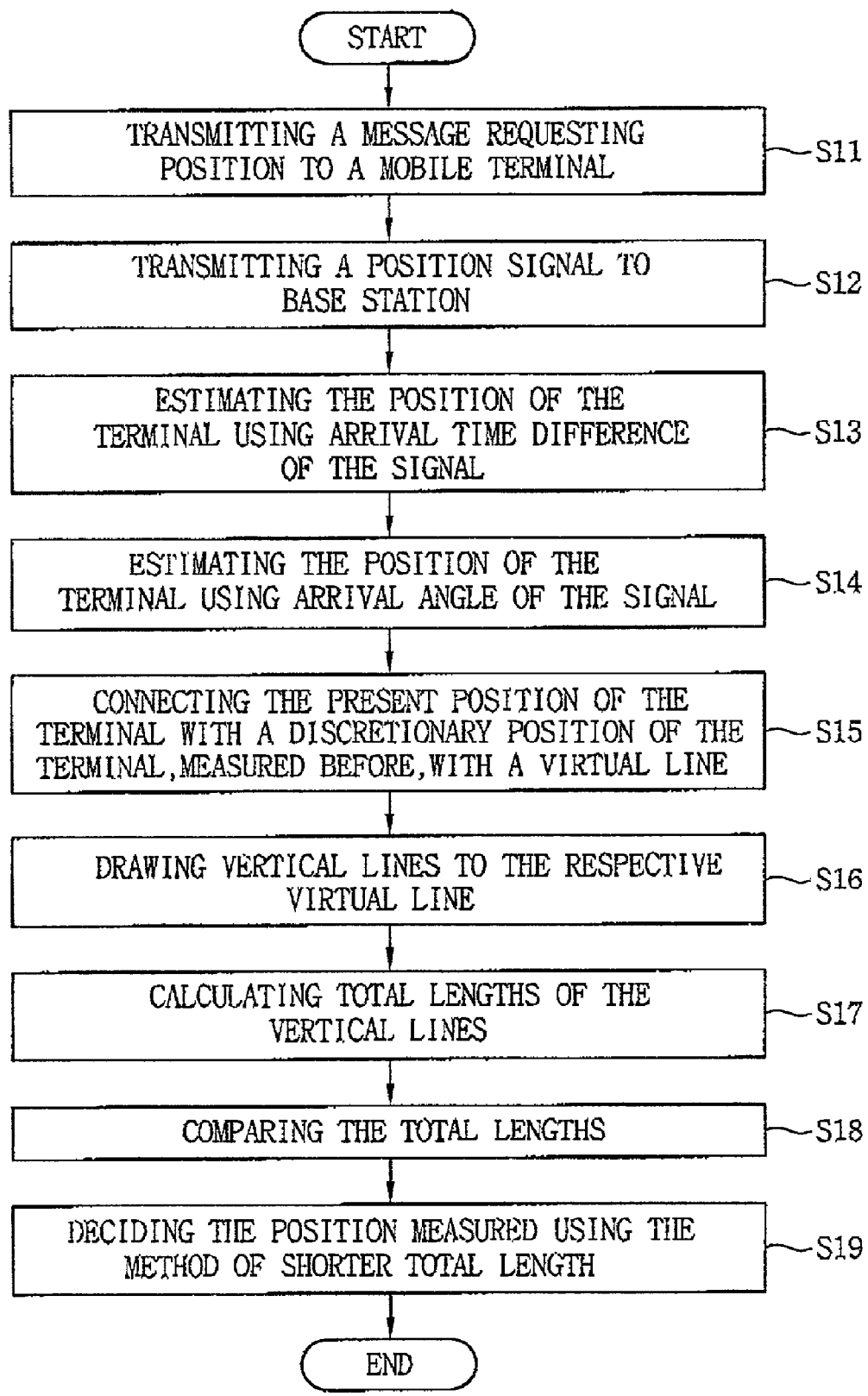
FIG. 6 illustrates a first embodiment flow chart of a position estimating method for the mobile communication terminal, according to the present invention.
Figure 7:
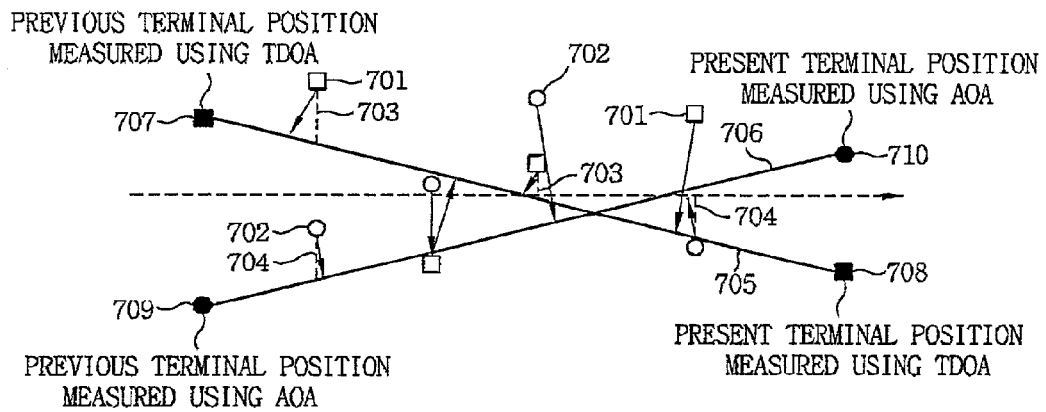
FIG. 7 illustrates a first embodiment graphical representation of the position estimating method for the mobile communication terminal, according to the present invention.

FIG. 6 is a flow chart showing a first embodiment of the position estimating method for the mobile communication terminal according to the present invention. FIG. 7 illustrates a graphical representation of the first embodiment for the position estimating method.

As shown in FIG. 6, whenever the mobile communication provider transmits a message requesting the position of the car to the mobile terminal 501 in the respective car (S11), mobile terminal 501 transmits a predetermined signal (S12). The system estimates the position of mobile terminal 501 using the signal, based on the arrival time difference (TDOA) method and the arrival angle (AOA) method (S13 and S14). The position estimating system of mobile terminal 501 selects one position, which is expected to be closest to the real position of the terminal, between the two position values of the terminal calculated using the TDOA and AOA methods.

That is, as shown in FIG. 7, the virtual x-y coordinate of mobile terminal 501 measured at present and the virtual x-y coordinates of mobile terminal 501 measured at an optional time earlier, for each position estimating method, are connected to form respective virtual lines (S15). Therefore, a virtual line 705 connecting the coordinates determined by the arrival time difference method and a virtual line 706 connecting the coordinates determined by the arrival angle method are drawn. The virtual lines connect the position of mobile terminal 501 measured at present 708, 710 to the position of mobile terminal 501 measured previously 707, 709, for each of the TDOA and AOA position estimating methods.

For each estimating method TDOA and AOA, four additional positional estimates of mobile terminal 501 are intermediately generated, in time. These four positional estimates are made in addition to the previous 707, 709 and present 708, 710 positional estimates forming the endpoints of the virtual lines (i.e., segments) 706, 705. Position deciding unit 507 figuratively draws a vertical line 703 from each TDOA calculated intermediate estimate 701 to the virtual line 705 connecting the previous and present positional estimates calculated by the TDOA method (S16). Similarly, position deciding unit 507 figuratively draws a vertical line 704 from each AOA (S16) calculated intermediate estimate 702 to the virtual line 706 connecting the previous and present positional estimates calculated by the AOA method. Then, position deciding unit 507 sums together the lengths of each of the four vertical lines 703 and separately sums together the lengths of the four vertical lines 704 (S17). Position deciding unit 507 compares the sum of lengths for vertical lines 703 to the sum of lengths for vertical lines 704 (S18). The lesser value of the two sums is selected to identify the particular one, of virtual lines 705, 706, that provides a better expected estimate of the movement of mobile terminal 501, for the examined period (S19). Therefore, the present positional estimate, serving as an endpoint to the identified one of virtual lines 705, 706, is selected to serve as the expected present position of mobile terminal 501.

For example, if the total length of the vertical lines 703 drawn from the positions 701 measured using the arrival time difference is shorter than the total length of the vertical lines 704 drawn from the positions 702 measured using the arrival angle, the present position 708 calculated by the arrival time difference is decided as the present position of mobile terminal 501.

The position calculated using the above method is automatically transmitted to application server 508, which requested the positional information of the mobile terminal user through the CDMA cellular network.

Figure 8:
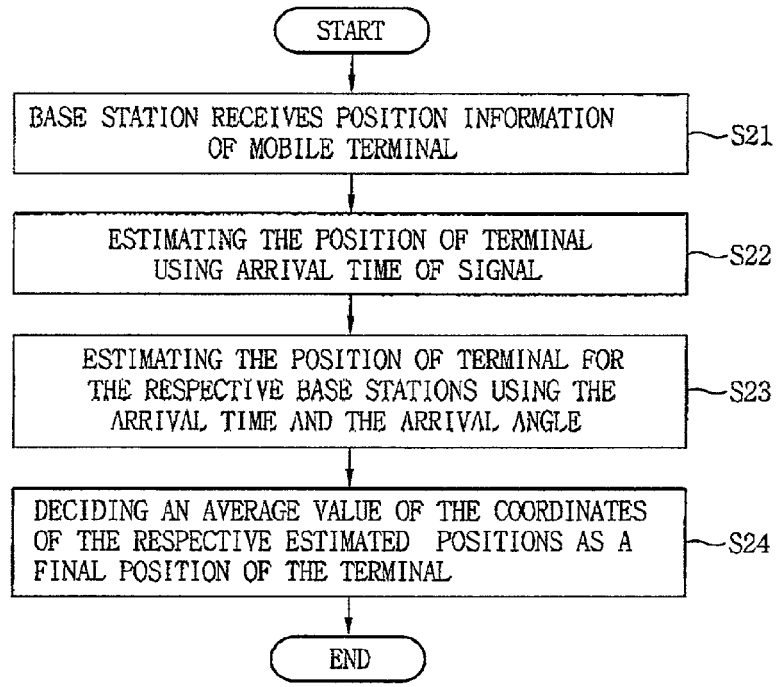
FIG. 8 illustrates a second embodiment flow chart of the position estimating method for the mobile communication terminal, according to the present invention.
Figure 9:
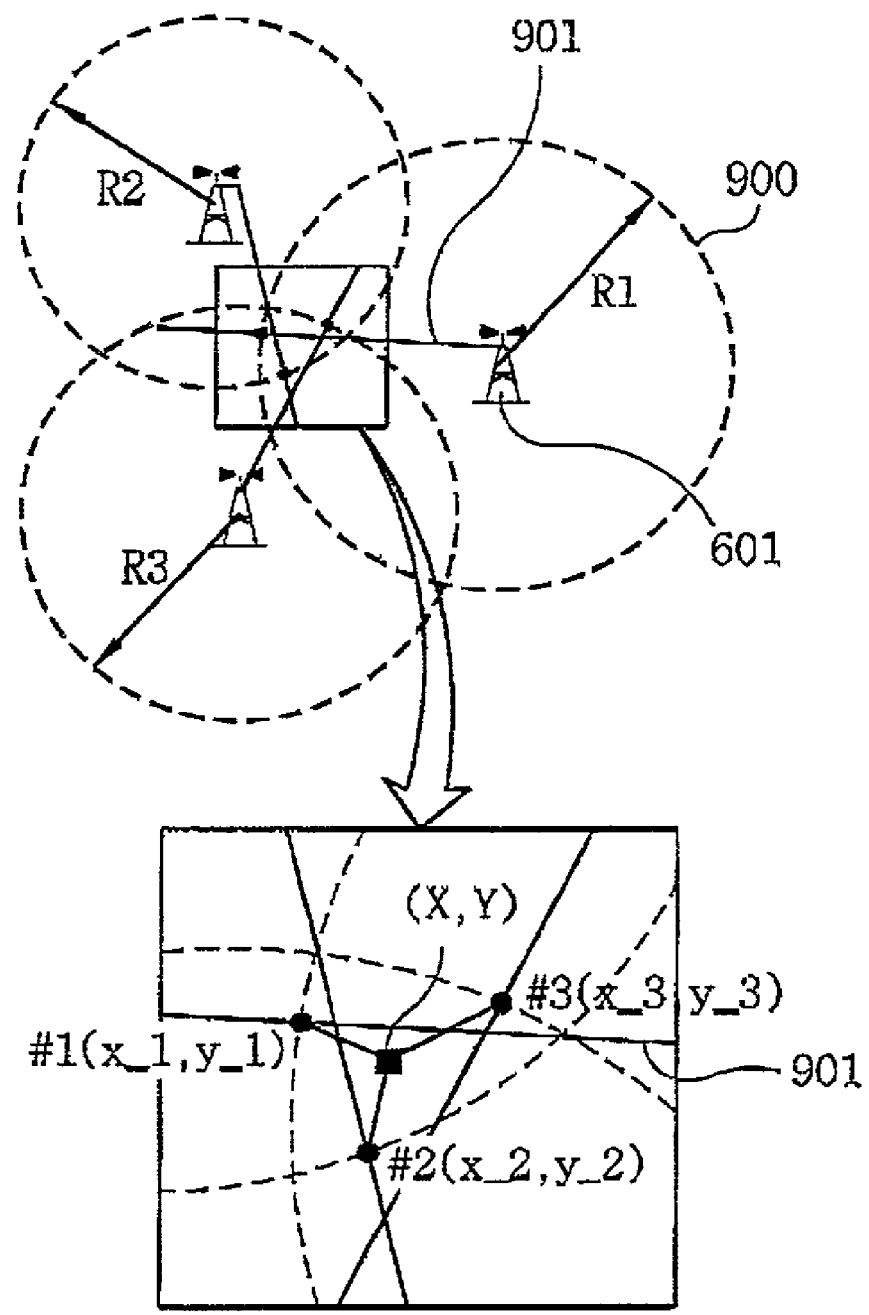
FIG. 9 illustrates a second embodiment graphical representation of the position estimating method for the mobile communication terminal, according to the present invention.

FIG. 8 is a flow chart showing the second embodiment of the position estimating method for the mobile communication terminal, according to the present invention. FIG. 9 illustrates a graphical representation of the position estimating method according to the second embodiment.

When the mobile terminal 501 transmits a certain signal to indicate its present position, base station 502 in the cell where terminal 501 is located and the other base stations 502 around the cell receive the signal (S21).

The signals received by each base station 502 are transmitted to TOA calculation unit 504 and AOA calculation unit 505, through mobile communication exchanger 503. TOA calculation unit 504 processes the signal transmitted to the respective base stations and calculates the times when the signal transmitted from mobile terminal 501 arrives at the respective base stations (S22). If the cell is large and, therefore, the distances between the base stations are very far, like in a suburban area, only the arrival angle of the signal, calculated by the antenna system installed on the base station of the cell where the user is located, is transmitted to AOA calculation unit 505. Otherwise, the arrival angles of the signal received by each nearby base station 502 are provided to AOA calculation unit 505.

The position estimating process, using the arrival time data and the arrival angle data calculated as above, will be described with reference to FIG. 9 as follows. A virtual circle 900 having a radius R1 is figuratively drawn and centered around a first base station 601 using the arrival time and the arrival angle of the mobile terminal signal for first base station 601. A virtual line 901 is figuratively drawn toward the arrival angle direction. A position where virtual circle 900 and virtual line 901 cross is set as a first estimated position of the mobile terminal #1 (x_1, y_1).

Using the above method, the estimated position #N(x_N, y_N) for each of the respective nearby base stations is set using the arrival time and arrival angle of the signal (S23).

An average value of the x coordinates ((x_1+x_2+ . . . x_N)/N) and an average value of the y coordinates ((y_1+ y_2+ . . . +y_N)/N) for the respective estimated positions (#1~#N), established by the above process, are found. Then, the above average coordinate value (X,Y) is selected as the final position of the mobile communication terminal (S24).

For example, suppose three estimated positions (#1, #2, and #3) are established by three base stations. The final position of the mobile terminal is decided as ((x_1+x_2+ x_3)/3), ((y_1+y_2+y_3)/3).

The position calculated as above is automatically transmitted to application server 508, which requested the position information of the user using the CDMA cellular network.

As described above, according to the position estimating apparatus and method for a mobile communication terminal of the present invention, the position estimating of the mobile terminal can be performed using the arrival angle, the arrival time, and the arrival time difference of the signal, even in a rural or suburban area where a plurality of base stations are not available. In addition, exact position estimating can be made when the mobile terminal is moving in a car.

Also, according to the position estimating apparatus and method for the mobile communication terminal of the present invention, the position estimating function of the mobile terminal can be improved in proportion to the number of base stations that receive the signal of the mobile terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A position estimating method comprising:
    determining a first position of a mobile communication terminal using an arrival angle of a first signal at each of a plurality of base stations;
    determining a second position of the mobile communication terminal using an arrival angle of a second signal at each of a plurality of base stations;
    determining a third position of a mobile communication terminal using a time difference of a third signal at each of a plurality of base stations;
    determining a fourth position of the mobile communication terminal using a time difference of a fourth signal at each of a plurality of base stations; and
    determining an expected present position of the mobile terminal based on the determined first position, the determined second position, the determined third position and the determined fourth position, wherein determining the expected present position includes:
        forming a first virtual line connecting graphical coordinates of the first position and the second position;
        forming a second virtual line connecting graphical coordinates of the third position and the fourth position; and
        determining the expected present position by selecting one of the first virtual line and the second virtual line.

2. The method of claim 1, wherein determining the expected present position comprises:
    determining additional positions of the mobile communication terminal using arrival angles of signals;
    determining additional positions of the mobile communication terminal using time differences of signals; and
    determining a more accurate depiction of the mobile terminal based on the additional positions of the mobile communication terminal.

3. A position estimating apparatus for a mobile communication terminal, comprising:
    a mobile communication exchanger that receives a signal of a mobile communication terminal, through a plurality of base stations;
    a time difference of arrival (TDOA) calculation unit that calculates a position of the mobile terminal using the difference in an arrival time of a signal at each of the respective base stations;
    an angle of arrival (AOA) calculation unit that calculates an angle of arrival between the mobile terminal and each of the base stations using an arrival angle of the signal at the respective base stations; and
    a position deciding unit that estimates the position of the mobile terminal based on calculations of the TDOA calculation unit and calculations of the AOA calculation unit, wherein the position deciding unit:
    determines a first position of a mobile communication terminal using an arrival angle of a first signal at each of the respective base stations;
    determines a second position of the mobile communication terminal using an arrival angle of a second signal at each of the respective base stations;
    determines a third position of the mobile communication terminal using a time difference of a third signal at each of the respective base stations;
    determines a fourth position of the mobile communication terminal using a time difference of a fourth signal at each of the respective base stations; and
    determines an expected present position of the mobile terminal based on the determined first position, second position, third position and fourth position, wherein determining the expected present position includes:
        forming a first virtual line connecting graphical coordinates of the first position and the second position;
        forming a second virtual line connecting graphical coordinates of the third position and the fourth position; and
        determining the expected present position by selecting one of the first virtual line and the second virtual line.

4. The method of claim 3, wherein determining the expected present position comprises:
    determining additional positions of the mobile communication terminal using arrival angles of signals;
    determining additional positions of the mobile communication terminal using time differences of signals; and
    determining a more accurate depiction of the mobile terminal based on the additional positions of the mobile communication terminal.

* * * * *